United States Patent
Bianchini et al.

(10) Patent No.: US 10,296,367 B2
(45) Date of Patent: May 21, 2019

(54) RESOURCE MANAGEMENT FOR VIRTUAL MACHINES IN CLOUD COMPUTING SYSTEMS

(71) Applicant: Microsoft Technology Licensing, LLC, Redmond, WA (US)

(72) Inventors: Ricardo Bianchini, Bellvue, WA (US); Eli Cortez, Redmond, WA (US); Marcus Felipe Fontoura, Clyde Hill, WA (US); Anand Bonde, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 15/424,305

(22) Filed: Feb. 3, 2017

(65) Prior Publication Data
US 2018/0225137 A1    Aug. 9, 2018

(51) Int. Cl.
*G06F 9/455* (2018.01)
*G06F 9/46* (2006.01)
(Continued)

(52) U.S. Cl.
CPC .......... *G06F 9/45558* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/4557;
(Continued)

(56) References Cited

U.S. PATENT DOCUMENTS

| 8,046,468 B2 | 10/2011 | Isci et al. |
| 8,504,689 B2 | 8/2013 | Ferris et al. |

(Continued)

FOREIGN PATENT DOCUMENTS

| WO | WO-2014047073 A1 | 3/2014 |
| WO | WO-2015027865 A1 | 3/2015 |

OTHER PUBLICATIONS

"International Search Report and Written Opinion Issued in PCT Application No. PCT/US18/015809", dated Sep. 26, 2018, 27 Pages.

(Continued)

*Primary Examiner* — Charles M Swift
(74) *Attorney, Agent, or Firm* — Ray Quinney & Nebeker, P.C.; James S. Bullough; Brandon K. Roper

(57) ABSTRACT

A system receives a request to deploy a virtual machine on a node from a plurality of nodes running a plurality of virtual machines in a cloud computing system. The system selects one of the plurality of nodes having a hard disk drive (HDD) input output operations per second (IOPS) value less than an observed HDD IOPS value for the plurality of nodes running the plurality of virtual machines. The system receives a predicted HDD IOPS value for the virtual machine and determines a new HDD IOPS value for the selected node based on the HDD IOPS value for the selected node and the predicted HDD IOPS value for the virtual machine. The system instantiates the virtual machine on the selected node when the new HDD IOPS value for the selected node is less than or equal to the observed HDD IOPS value for the plurality of nodes.

16 Claims, 10 Drawing Sheets

(51) Int. Cl.
*G06F 15/173* (2006.01)
*G06F 9/50* (2006.01)
*G06F 9/48* (2006.01)

(52) U.S. Cl.
CPC .............. *G06F 9/48* (2013.01); *G06F 9/485* (2013.01); *G06F 9/4843* (2013.01); *G06F 9/4856* (2013.01); *G06F 9/4881* (2013.01); *G06F 9/50* (2013.01); *G06F 9/505* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5044* (2013.01); *G06F 9/5055* (2013.01); *G06F 9/5077* (2013.01); *G06F 9/5083* (2013.01); *G06F 9/5088* (2013.01); *G06F 9/5072* (2013.01); *G06F 2009/4557* (2013.01); *G06F 2009/45575* (2013.01); *G06F 2009/45583* (2013.01); *Y02D 10/22* (2018.01); *Y02D 10/36* (2018.01)

(58) Field of Classification Search
CPC ............. G06F 2009/45575; G06F 9/48; G06F 9/4843; G06F 9/485; G06F 9/4856; G06F 9/4881; G06F 9/50; G06F 9/5005; G06F 9/5011; G06F 9/5016; G06F 9/5022; G06F 9/5027; G06F 9/5044; G06F 9/505; G06F 9/5055; G06F 9/5083; G06F 9/5088
See application file for complete search history.

(56) References Cited

U.S. PATENT DOCUMENTS

| | | | |
|---|---|---|---|
| 8,788,855 B2 | 7/2014 | Cong et al. | |
| 8,826,277 B2 | 9/2014 | Chang et al. | |
| 8,832,239 B2 | 9/2014 | Assuncao et al. | |
| 8,881,142 B1 | 11/2014 | Reid et al. | |
| 8,903,983 B2 | 12/2014 | Bakman et al. | |
| 8,930,948 B2 | 1/2015 | Shanmuganathan et al. | |
| 9,298,443 B2 | 3/2016 | Dias de Assuncao et al. | |
| 9,465,630 B1* | 10/2016 | Muniz | G06F 9/455 |
| 9,471,394 B2 | 10/2016 | Perlegos et al. | |
| 9,898,319 B2 | 2/2018 | Hsu et al. | |
| 2007/0271560 A1* | 11/2007 | Wahlert | G06F 8/61 718/1 |
| 2010/0058342 A1 | 3/2010 | Machida | |
| 2011/0072138 A1 | 3/2011 | Canturk et al. | |
| 2011/0099548 A1 | 4/2011 | Shen et al. | |
| 2011/0154320 A1* | 6/2011 | Verma | G06F 8/63 718/1 |
| 2011/0276981 A1 | 11/2011 | Clohessy et al. | |
| 2012/0131594 A1 | 5/2012 | Morgan | |
| 2012/0137002 A1 | 5/2012 | Ferris et al. | |
| 2012/0324444 A1 | 12/2012 | Gulati et al. | |
| 2013/0097601 A1* | 4/2013 | Podvratnik | G06F 9/5027 718/1 |
| 2014/0032761 A1* | 1/2014 | Beveridge | G06F 9/5011 709/226 |
| 2014/0215076 A1 | 7/2014 | Grothues | |
| 2014/0359091 A1* | 12/2014 | Senniappan | H04L 41/12 709/221 |
| 2014/0373010 A1* | 12/2014 | Folco | G06F 9/45533 718/1 |
| 2015/0039764 A1* | 2/2015 | Beloglazov | H04L 47/70 709/226 |
| 2015/0143364 A1* | 5/2015 | Anderson | G06F 9/5088 718/1 |
| 2015/0178019 A1* | 6/2015 | Hegdal | G06F 3/0664 711/170 |
| 2015/0234674 A1 | 8/2015 | Zhong | |
| 2015/0242234 A1* | 8/2015 | Harris | G06F 9/4856 718/1 |
| 2015/0317081 A1 | 11/2015 | Singh et al. | |
| 2015/0355923 A1 | 12/2015 | Keller | |
| 2015/0365349 A1 | 12/2015 | Verma | |
| 2016/0070602 A1 | 3/2016 | Shimogawa | |
| 2016/0094410 A1 | 3/2016 | Anwar et al. | |
| 2016/0103699 A1* | 4/2016 | Thakkar | G06F 9/45558 718/1 |
| 2016/0162308 A1* | 6/2016 | Chen | G06F 9/45558 718/1 |
| 2016/0205039 A1 | 7/2016 | Akolkar et al. | |
| 2016/0241637 A1 | 8/2016 | Marr et al. | |
| 2016/0378519 A1 | 12/2016 | Gaurav et al. | |
| 2017/0134237 A1 | 5/2017 | Yang et al. | |
| 2017/0185438 A1 | 6/2017 | Thomas et al. | |
| 2017/0308393 A1 | 10/2017 | Chen et al. | |
| 2018/0121237 A1 | 5/2018 | Crowe et al. | |
| 2018/0225149 A1 | 8/2018 | Bianchini et al. | |

OTHER PUBLICATIONS

Birke, et al., "Data Centers in the Wild: A Large Performance Study", In Technical Research Report, Apr. 2012, 13 Pages.
"Non Final Office Action Issued in U.S. Appl. No. 15/424,321", dated Jul. 30, 2018, 20 Pages.
"International Search Report and Written Opinion Issued in PCT Application No. PCT/US18/015813", dated Aug. 14, 2018, 22 Pages.
Saddar, et al., "Future Load Prediction of Virtual Machines in Cloud Computing Environment", in International Journal of Advanced Computer Technology, Jan. 2014, 4 pages.
"Notice of Allowance Issued in U.S. Appl. No. 15/424,321", dated Jan. 8, 2019, 8 Pages.
Beloglazov, et al., "Adaptive Threshold-Based Approach for Energy-Efficient Consolidation of Virtual Machines in Cloud Data Centers", In MGC@ Middleware, Part 4, Nov. 29-Dec. 3, 2010, 6 Pages.
Mills, et al., "Comparing VM-Placement Algorithms for On-Demand Clouds", In Third IEEE International Conference on Coud Computing Technology and Science, 2011, 8 Pages.
"International Search Report And Written Opinion Issued In PCT Application No. PCT/US18/059913", dated Feb. 25, 2019, 12 Pages.

* cited by examiner

FIG. 7

| Type G: Extreme Perf., SSD | | |
|---|---|---|
| Type | Cores | Ram |
| G1 | 2 | 28 |
| G2 | 4 | 56 |
| G3 | 8 | 112 |
| G4 | 16 | 224 |
| G5 | 32 | 448 |

| Type D: Low-latency, SSD | | |
|---|---|---|
| Type | Cores | Ram |
| D1 | 1 | 3.5 |
| D2 | 4 | 7 |
| D3 | 4 | 14 |
| D4 | 8 | 28 |
| D11 | 2 | 14 |
| D12 | 4 | 28 |
| D13 | 8 | 56 |
| D14 | 16 | 112 |

| Type A: High-value | | |
|---|---|---|
| Type | Cores | Ram |
| A0 | 1 | .768 |
| A1 | 1 | 1.75 |
| A2 | 2 | 3.5 |
| A3 | 4 | 7 |
| A4 | 8 | 14 |
| A5 | 2 | 14 |
| A6 | 4 | 28 |
| A7 | 8 | 56 |
| A8 | 8 | 56 |
| A9 | 16 | 112 |
| A10 | 8 | 56 |
| A11 | 16 | 112 |

RESOURCE MANAGEMENT FOR VIRTUAL MACHINES IN CLOUD COMPUTING SYSTEMS

FIELD

The present disclosure relates generally to cloud computing systems and more particularly to resource management for virtual machines in cloud computing systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Providers of cloud computing systems (e.g., Microsoft, Amazon, IBM, and so on) invest heavily in cloud infrastructure. Effectively utilizing and monetizing the cloud infrastructure can be a difficult task. For example, the average CPU utilization of the cloud infrastructure can be very low (e.g., less than 10%). The yearly monetary cost associated with each 1% of under-utilization of the cloud infrastructure can be significant. The cost can grow as the cloud infrastructure gets updated with newer hardware and other resources while still being underutilized.

SUMMARY

A system comprises a processor and memory and machine readable instructions stored in the memory. When executed by the processor, the machine readable instructions configure the processor to receive a request to deploy a virtual machine on a node from a plurality of nodes running a plurality of virtual machines in a cloud computing system. The machine readable instructions configure the processor to select one of the plurality of nodes having a hard disk drive (HDD) input output operations per second (IOPS) value less than an observed HDD IOPS value for the plurality of nodes running the plurality of virtual machines. The machine readable instructions configure the processor to receive a predicted HDD IOPS value for the virtual machine and determine a new HDD IOPS value for the selected node based on the HDD IOPS value for the selected node and the predicted HDD IOPS value for the virtual machine. The machine readable instructions configure the processor to instantiate the virtual machine on the selected node when the new HDD IOPS value for the selected node is less than or equal to the observed HDD IOPS value for the plurality of nodes.

In other features, the machine readable instructions further configure the processor to collect data regarding HDD IOPS performed by the plurality of nodes when running the plurality of virtual machines and to generate the observed HDD IOPS value for the plurality of nodes based on the collected data.

In other features, the machine readable instructions further configure the processor to collect data regarding HDD IOPS performed by the plurality of nodes when running the plurality of virtual machines and to generate the predicted HDD IOPS value for the virtual machine based on the collected data.

In other features, the observed HDD IOPS value for the plurality of nodes include one or more of an average HDD IOPS value for the plurality of nodes and a maximum HDD IOPS value for the plurality of nodes. The predicted HDD IOPS value for the virtual machine includes one or more of an average predicted HDD IOPS value for the virtual machine and a maximum predicted HDD IOPS value for the virtual machine.

In other features, the machine readable instructions further configure the processor to update the HDD IOPS value for the selected node and the observed HDD IOPS value for the plurality of nodes when the virtual machine is instantiated on the selected node.

In other features, the machine readable instructions further configure the processor to update the HDD IOPS value for the selected node and the observed HDD IOPS value for the plurality of nodes when the virtual machine terminates on the selected node.

In other features, the machine readable instructions further configure the processor to update the observed HDD IOPS value for the plurality of nodes when one of the plurality of virtual machines terminates on the plurality of nodes.

In other features, the machine readable instructions further configure the processor to dynamically track average or maximum HDD IOPS value for each of the plurality of nodes.

In other features, the machine readable instructions further configure the processor to not track average or maximum HDD IOPS value for each of the plurality of virtual machines.

In still other features, a method comprises receiving a request to deploy a virtual machine on a node from a plurality of nodes running a plurality of virtual machines in a cloud computing system. The method further comprises collecting data regarding hard disk drive (HDD) input output operations per second (IOPS) performed by the plurality of nodes when running the plurality of virtual machines. The method further comprises selecting one of the plurality of nodes having a hard disk drive (HDD) input output operations per second (IOPS) value less than an observed HDD IOPS value for the plurality of nodes running the plurality of virtual machines, the observed HDD IOPS value being generated based on the collected data. The method further comprises receiving a predicted HDD IOPS value for the virtual machine, the predicted HDD IOPS value being generated based on the collected data. The method further comprises determining a new HDD IOPS value for the selected node based on the HDD IOPS value for the selected node and the predicted HDD IOPS value for the virtual machine. The method further comprises instantiating the virtual machine on the selected node when the new HDD IOPS value for the selected node is less than or equal to the observed HDD IOPS value for the plurality of nodes.

In other features, the observed HDD IOPS value for the plurality of nodes include one or more of an average HDD IOPS value for the plurality of nodes and a maximum HDD IOPS value for the plurality of nodes. The predicted HDD IOPS value for the virtual machine includes one or more of an average predicted HDD IOPS value for the virtual machine and a maximum predicted HDD IOPS value for the virtual machine.

In other features, the method further comprises updating the HDD IOPS value for the selected node and the observed HDD IOPS value for the plurality of nodes when the virtual machine is instantiated on the selected node.

In other features, the method further comprises updating the HDD IOPS value for the selected node and the observed HDD IOPS value for the plurality of nodes when the virtual machine terminates on the selected node.

In other features, the method further comprises updating the observed HDD IOPS value for the plurality of nodes when one of the plurality of virtual machines terminates on the plurality of nodes.

In other features, the method further comprises dynamically tracking average or maximum HDD IOPS value for each of the plurality of nodes.

In other features, the method further comprises not tracking average or maximum HDD IOPS value for each of the plurality of virtual machines.

In still other features, a system comprises a processor and memory and machine readable instructions stored in the memory. When executed by the processor, the machine readable instructions configure the processor to receive a request to deploy a virtual machine on one of a plurality of nodes running a plurality of virtual machines in a cloud computing system. The machine readable instructions configure the processor to receive a prediction indicating that the virtual machine is of a first type that is amenable to a limited amount of performance degradation or a second type that is not amenable to performance degradation. The machine readable instructions configure the processor to receive predictions regarding utilization of a plurality of resources by the virtual machine. The machine readable instructions configure the processor to select an oversubscribed node from the plurality of nodes, where an oversubscribed node is a node on which in aggregate, more than available resources are allocated to one or more of the plurality of virtual machines. The machine readable instructions configure the processor to allocate the virtual machine to the oversubscribed node when the virtual machine is of the first type and when a predicted utilization of each resource on the oversubscribed node by the virtual machine and by one or more of the plurality of virtual machines is less than or equal to a predetermined limit. The machine readable instructions configure the processor to not allocate the virtual machine to the oversubscribed node when the virtual machine is of the second type.

In other features, the first type of virtual machines includes virtual machines that are non-user-facing or that can run in background in a batch mode, and the second type of virtual machines includes virtual machines that are user-facing.

In other features, the predetermined limit is based on a maximum predicted utilization of each resource on the oversubscribed node by the virtual machine and by one or more of the plurality of virtual machines.

In other features, the machine readable instructions further configure the processor to collect data regarding utilization of resources of the plurality of nodes by first and second types of virtual machines from the plurality of virtual machines, and to generate the prediction indicating that the virtual machine is of the first type or the second type based on the collected data.

In other features, the machine readable instructions further configure the processor to collect data regarding utilization of resources of the plurality of nodes by the plurality of virtual machines, and to generate the predictions regarding the utilization of the plurality of resources by the virtual machine based on the collected data.

In other features, the machine readable instructions further configure the processor to update the predicted utilization of each resource on the oversubscribed node when the virtual machine is allocated to the oversubscribed node.

In other features, the machine readable instructions further configure the processor to update the predicted utilization of each resource on the oversubscribed node when the virtual machine terminates on the oversubscribed node.

In other features, the machine readable instructions further configure the processor to update the predicted utilization of each resource on the oversubscribed node when one or more virtual machines terminate on the oversubscribed node.

In other features, the machine readable instructions further configure the processor to not track average or maximum resource utilization for each of the plurality of virtual machines.

In still other features, a method comprises receiving a request to deploy a virtual machine on one of a plurality of nodes running a plurality of virtual machines in a cloud computing system. The method further comprises collecting data regarding utilization of resources of the plurality of nodes by the plurality of virtual machines. The method further comprises receiving, based on the collected data, a prediction indicating that the virtual machine is of a first type that is amenable to a limited amount of performance degradation or a second type that is not amenable to performance degradation. The method further comprises receiving, based on the collected data, predictions regarding utilization of a plurality of resources by the virtual machine. The method further comprises selecting an oversubscribed node from the plurality of nodes, where an oversubscribed node is a node on which in aggregate, more than available resources are allocated to one or more of the plurality of virtual machines. The method further comprises allocating the virtual machine to the oversubscribed node when the virtual machine is of the first type and when a predicted utilization of each resource on the oversubscribed node by the virtual machine and by one or more of the plurality of virtual machines is less than or equal to a predetermined limit. The method further comprises not allocating the virtual machine to the oversubscribed node when the virtual machine is of the second type.

In other features, the first type of virtual machines includes virtual machines that are non-user-facing or that can run in background in a batch mode, and the second type of virtual machines includes virtual machines that are user-facing.

In other features, the predetermined limit is based on a maximum predicted utilization of each resource on the oversubscribed node by the virtual machine and by one or more of the plurality of virtual machines.

In other features, the method further comprises updating the predicted utilization of each resource on the oversubscribed node when the virtual machine is allocated to the oversubscribed node.

In other features, the method further comprises updating the predicted utilization of each resource on the oversubscribed node when the virtual machine terminates on the oversubscribed node.

In other features, the method further comprises updating the predicted utilization of each resource on the oversubscribed node when one or more virtual machines terminate on the oversubscribed node.

In other features, the method further comprises not tracking average or maximum resource utilization for each of the plurality of virtual machines.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 7 shows examples of different types of virtual machines.

In the drawings, reference numbers may be reused to identify similar and/or identical elements.

DESCRIPTION

The problem of under-utilization of resources in cloud infrastructure can be handled in many ways. For example, in a cloud computing system, a virtual machine (VM) allocator can tightly pack VMs onto servers based on the VMs' maximum resource requirements. Tighter packing can be achieved if the VM allocator has the following information: (1) information about the actual VM resource requirements instead of just maximum resource sizes; and/or (2) information whether the VMs will run user-facing workloads versus background/batch workloads. This information can assist a resource manager of the cloud computing system in selecting VM co-locations that oversubscribe the physical servers while minimizing VM interference. Further, a front-end of the cloud computing system, which selects a cluster for each tenant, can reduce the size of growth buffers reserved for scale-out (explained below with reference to FIG. 6) if the front end can have information about how large the tenants' deployments would eventually become.

Accordingly, the efficiency of VM allocation and resource management in the cloud computing system can be significantly improved if accurate predictions are available about future VM and tenant behaviors. Historical data about VMs and tenants can be leveraged to produce such predictions. For example, the historical data may indicate that many VM roles exhibit remarkably consistent peak CPU utilizations over time; VM roles that execute user-facing workloads consistently do so over time; tenant deployment sizes are unlikely to vary widely over time; and so on. In these cases, past behaviors are reasonable predictors of future behaviors.

The resource management systems and methods of the present disclosure learn from these past behaviors and, when requested, produce predictions of future behaviors. For example, before selecting servers to run a particular VM deployment, the VM allocator can obtain from the resource management system any predictions on the potential behavior of the VMs that the VM allocator is about to allocate. With this information, the VM allocator can make a more informed set of selections.

Figure 1:
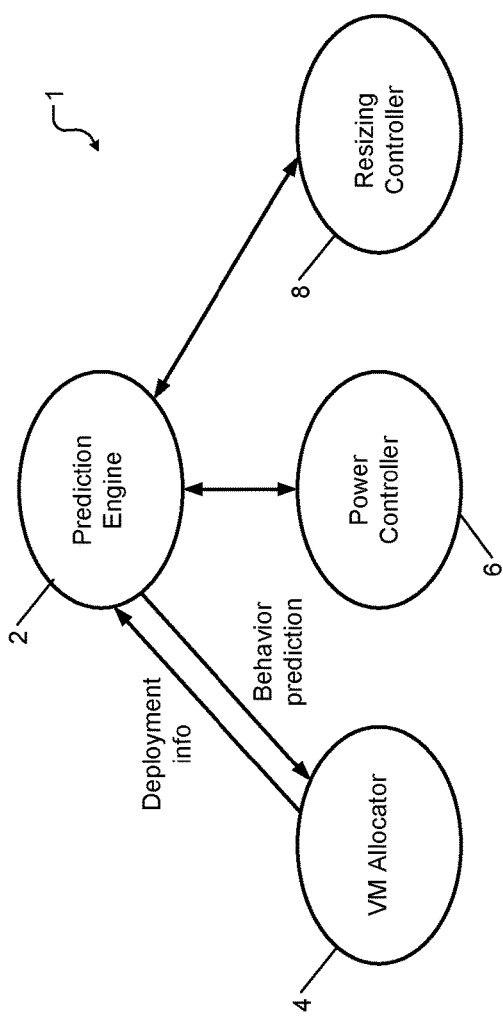
FIG. 1 is a simplified schematic of an example of a resource management system including a prediction engine and a virtual machine allocator for a cloud computing system.

FIG. 1 shows a resource management system 1 including a prediction engine 2 that can provide prediction information to a VM allocator 4, a power controller 6, and a resource resizing controller 8. The VM allocator 4 can decide where to place a VM based on one or more predictions for the VM provided by the prediction engine 2. The power controller 6 for a rack of servers can find out from the prediction engine 2 which of the currently running VMs (the VM roles) are likely to be user-facing and should receive a greater fraction of the power budget for the rack than non-user-facing VMs when a power cap violation occurs at the rack (i.e., when power consumption at the rack exceeds a predetermined limit). The resource resizing controller 8 can benefit from similar information for each VM role as well as data on previously observed resource utilization peaks provided by the prediction engine 2, which can be used to resize the resources allocated to the VMs.

Figure 2:
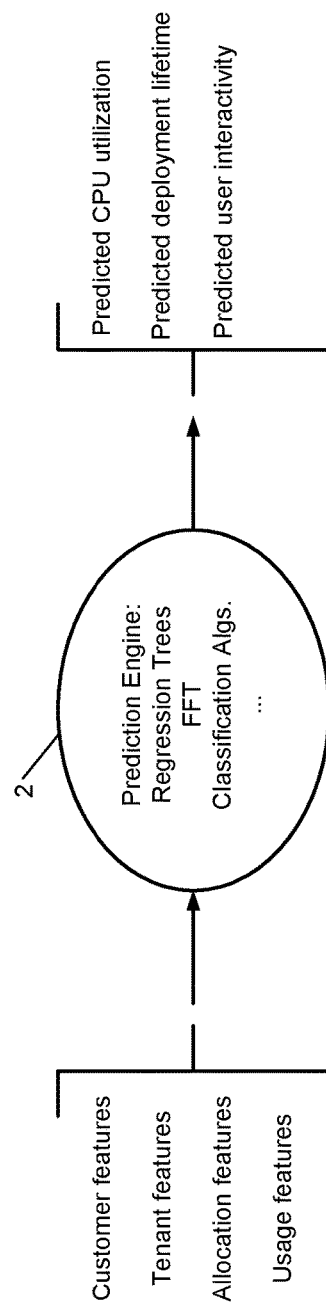
FIG. 2 is a simplified schematic of an example of the prediction engine of the resource management system of FIG. 1.

FIG. 2 illustrates the prediction engine 2 of the resource management system 1 with its input features, learning techniques, and output predictions. The prediction engine 2 can use data mining and machine learning techniques to identify correlations that can be leveraged in resource management. For example, the prediction engine 2 can receive a large set of customer, tenant, allocation, and usage features as inputs for learning purposes. Examples of these features include customer name, customer type (e.g., internal, external), deployment type (PaaS vs IaaS), time of deployment, number of VMs, VM roles, VM IDs, VM resource utilizations, and times of shutdown.

After an online training period, other components of the resource management system 1 can query the prediction engine 2 with a subset of these features, expecting to receive predictions for the other features. For example, the VM allocator 4 may query the prediction engine 2 while providing information including a customer name, customer type, deployment type, time of deployment, and VM role. The prediction engine 2 can then provide the VM allocator 4 a prediction of how large the deployment by this customer may become and how high these VMs' resource utilizations may grow over time. Similarly, the power controller 6 may query the prediction engine 2 with a set of VM IDs, expecting to receive a prediction on which of these VMs are likely to be user-facing. The resource resizing controller 8 can use the predictions to resize (i.e., adjust the amount of) the resources allocated to the VMs.

The prediction engine 2 can leverage multiple techniques and algorithms to produce the predictions. For example, the prediction engine 2 may use Regression Trees to produce deployment size or VM lifetime estimates; the prediction engine 2 may use Fast Fourier Transforms on the CPU utilization time series to infer whether a VM role is likely to be user-facing; and so on.

The prediction engine 2 can be an online service in each Availability Zone of the cloud computing system. The prediction engine 2 may implement a combination of offline and online operations. For example, predicting CPU utilization may run offline and may produce a model that is updated online, with short-term tenant operations occurring in each Availability Zone.

Examples of predictions provided by the prediction engine 2 include the following. 1) VM lifetime; 2) VM average and maximum resource utilizations (for all resources, not just CPU); 3) VM category (potentially user-facing vs non-user-facing); 4) Deployment size; 5) Usage patterns (e.g., usage during weekdays but idleness over weekends); and so on.

The predictions provided by the prediction engine 2 can be used to improve resource allocation and the quality of VM placements in the cloud computing system fabric. For example, before selecting the servers on which to run a particular VM deployment, the VM allocator 4 can obtain predictions from the prediction engine 2 on the potential behavior of the VMs that the VM allocator 4 is about to allocate (e.g., the expected lifetime and expected maximum resource utilization of the VMs). With this information, the VM allocator 4 can make a more informed set of selections. While the present disclosure refers to maximum utilization, the prediction engine 2 can also predict high-percentile utilizations when the maximum utilization is inappropriate.

Based on the predictions, the VM allocator 4 can perform placement of VMs on physical servers and/or the front end can perform cluster selection. For example: 1) VM lifetime predictions can be used to start transient VMs on servers that will soon be decommissioned; 2) VM lifetime predictions can be used to group VMs with similar (or diverse) lifetimes to help with availability/updates; 3) VM maximum resource utilization predictions can be used to group VMs that require different resources (e.g., combining I/O-bound VMs with CPU-bound VMs, combining high CPU usage VMs with low CPU usage VMs, and so on); 4) VM category predictions can be used to implement oversubscription of only those servers that run particular workloads (i.e., segregating user-facing VMs and oversubscribing servers with non-user-facing VMs); 5) VM category predictions can also be used to produce diverse VM allocations that can help with power capping (e.g., every chassis can have some number of non-user-facing VMs that can be power-capped); 6) VM maximum resource utilization predictions can also be used to perform aggressive oversubscription without the risk of exhausting physical resources; 7) VM deployment size predictions can be used to select a cluster that will allow deployments to grow; and so on.

While many more use cases are contemplated, the following specific use cases for cluster selection and server allocation are described below in detail. 1) Using average/maximum hard disk drive (HDD) input/output operations per second (IOPS) predictions to minimize the co-location of VMs that are HDD-bound; 2) Using VM category and average/maximum utilization predictions to implement oversubscription; 3) Mixing VMs with similar/dissimilar lifetimes on the same servers; 4) Using deployment size predictions to select an appropriate cluster and allow growth; and 5) Mixing VMs of different categories on the same aggregation (e.g., chassis) to help power capping.

The present disclosure is organized as follows. Before discussing the specific use cases in detail, examples of a cloud computing system, a cluster, healing and growth buffers, and types of VMs are described with reference to FIGS. 3-7. Subsequently, the specific use cases mentioned above are described in detail with reference to FIGS. 8-11. The cloud computing system shown in FIG. 3 can implement the resource management system 1 shown in FIGS. 1-2 and can implement the specific use cases described with reference to FIGS. 8-11. Thereafter, a simplified example of a distributed network system is described with reference to FIGS. 12-14, which can be used to implement the cloud computing system shown in FIG. 3.

Figure 3:
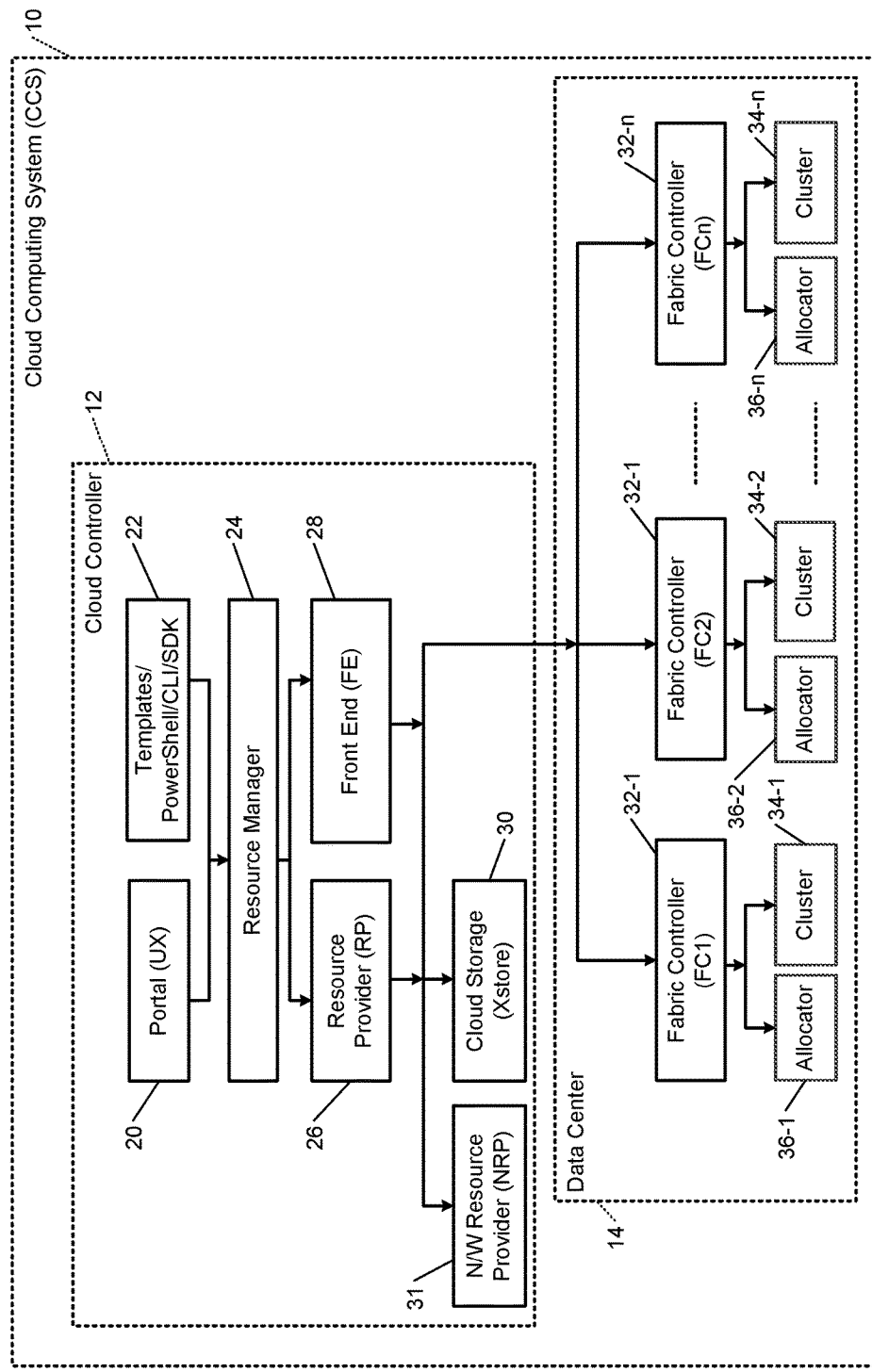
FIG. 3 is a functional block diagram of a simplified example of a cloud computing system that utilizes the resource management system of FIG. 1 to deploy virtual machines.

FIG. 3 shows a simplistic example of a cloud computing system (CCS) 10 according to the present disclosure. The cloud computing system 10 includes a cloud controller 12 and at least one data center 14. While only one data center 14 is shown for simplicity, the cloud controller 12 can interface with a plurality of data centers. Further, while the data center 14 is shown as being local to the cloud controller 12, one or more data centers may be geographically remote from the cloud controller 12, may be located in different geographic locations (e.g., in different time zones, different countries or continents, and so on), and may communicate with the cloud controller 12 via various networks.

Each data center 14 includes a plurality of fabric controllers 32-1, 32-2, . . . , 32-$n$ (collectively fabric controllers 32) and corresponding clusters 34-1, 34-2, . . . , 34-$n$ (collectively clusters 34). Each fabric controller 32 controls a respective cluster 34. Each cluster 34 includes a plurality of racks (shown in FIGS. 4-5), and each rack includes a plurality of nodes (shown in FIG. 5), which are also called servers, hosts, or machines throughout the present disclosure. Each fabric controller 32 is associated with an allocator 36 that allocates resources within the cluster 34 for instances of customer services hosted on the cluster 34.

The cloud controller 12 includes a portal 20 and a software development kit (SDK) 22 that the customers can use to select resources and request service deployment. The cloud controller 12 further includes a cloud resource manager 24, a compute resource provider 26, and a front-end 28. The front-end 28 interfaces with the fabric controllers 32. The cloud resource manager 24 receives the customer selections and forwards the customer selections to the compute resource provider 26. The compute resource provider 26 generates a tenant model based on the customer selections. The compute resource provider 26 provisions resources to the customer services according to the tenant model generated based on the customer selections. The compute resource provider 26 provisions storage, networking, and computing resources by interfacing with a cloud storage (Xstore) 30, a network resource provider 31, and the fabric controllers 32. The compute resource provider 26 and the fabric controllers 32 can at least partially implement the resource management system 1 shown in FIGS. 1-2.

Figure 4:
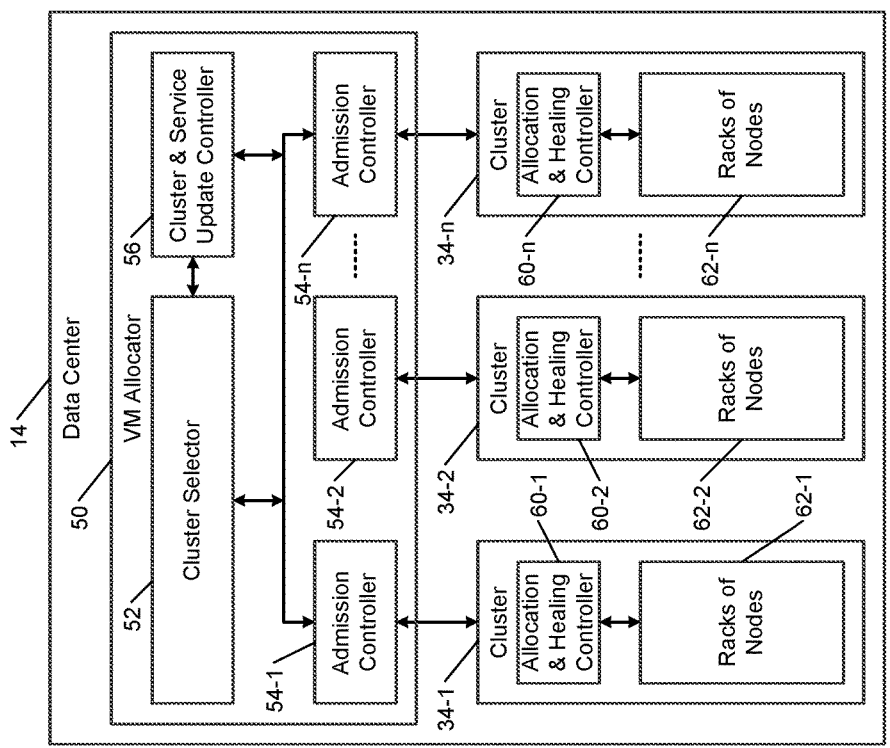
FIG. 4 is a functional block diagram of a simplified example of a data center shown in FIG. 3 that utilizes the resource management system of FIG. 1 to deploy virtual machines.

FIG. 4 shows a simplistic example of a data center (e.g., the data center 14 shown in FIG. 3). The data center 14 includes a VM allocator 50 and the clusters 34. The VM allocator 50 can implement the VM allocator 4 of FIG. 1. The VM allocator 50 includes a cluster selector 52 and a plurality of admission controllers 54-1, 54-2, . . . , 54-$n$ (collectively admission controllers 54). Each admission controller 54 is associated with a corresponding cluster 34. Each cluster 34 includes an allocation and healing controller 60 (shown as allocation and healing controllers 60-1, 60-2, ..., and 60-n; one allocation and healing controller per cluster) and one or more racks 62 of nodes (also called servers, hosts, or machines; and shown as racks 62-1, 62-2, ..., 62-n). The allocation and healing controller 60 can implement the VM allocator 36 of FIG. 3.

Allocating a VM can be a multilevel allocation operation. The VM allocator 50 first selects one of the clusters 34 in which to allocate a VM in association with the corresponding admission controller 54. After the VM allocator 50 selects one of the clusters 34 to allocate the VM, the allocation and healing controller 60 of the selected cluster 34 places the VM on one or more of the nodes in one or more of the racks 62 in the selected cluster 34 depending on the number of update and fault domains and other resources specified by the customer and based on the predictions provided by the prediction engine 2.

Based on VM activity in the clusters 34, a cluster and service update controller 56 provides updates to the cluster selector 52 and the resource management system 1, which can be partly implemented by the VM allocator 50 and the allocation and healing controllers 60. For example, the VM activity may include activation and termination of one or more VM's in the clusters 34. The cluster and service update controller 56 may also provide updates to the cluster selector 52 and the resource management system 1 regarding utilization of growth buffers due to service scale out and utilization of healing buffers due to node/rack failures, which are explained below with reference to FIG. 6.

Figure 5:
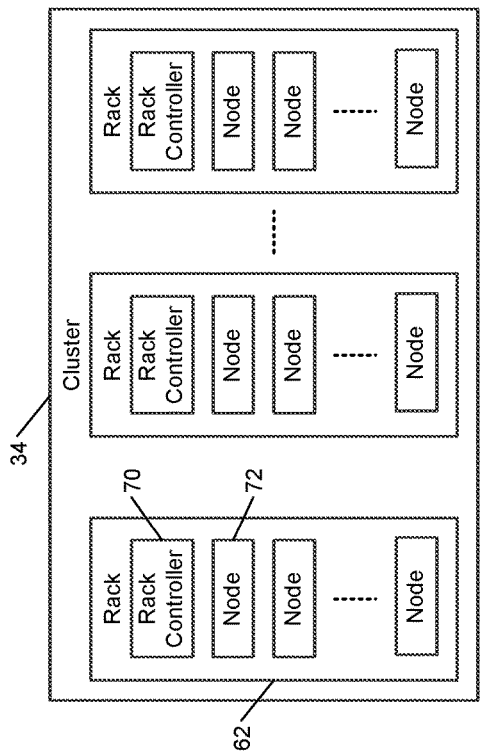
FIG. 5 is a functional block diagram of a simplified example of a cluster shown in FIG. 3.

FIG. 5 shows an example of a cluster (e.g., the cluster 34 shown in FIGS. 3-4). Each cluster 34 includes the plurality of racks 62. Each rack 62 includes a rack controller 70 and a plurality of nodes 72. Each rack controller 70 includes a power controller (e.g., the power controller 6 shown in FIG. 1) that controls power allocation to the plurality of nodes 72 in the rack 62.

Figure 6:
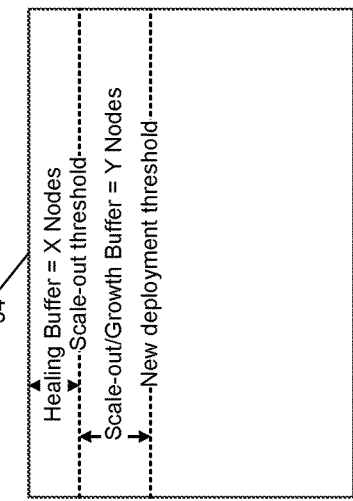
FIG. 6 shows a simplified example of a healing buffer and a scale-out/growth buffer in a cluster.

FIG. 6 shows an example of a scale out/growth buffer and a healing buffer in a cluster (e.g., the cluster 34 shown in FIGS. 3-5). Each of the scale out/growth buffer and the healing buffer can comprise a plurality of the nodes 72 within the cluster 34. If a node 72 or a rack 62 fails in the cluster 34, the VM's running on the failed component are healed using the plurality of nodes in the healing buffer. If a service needs to scale out (i.e., expand beyond the allocated resources, which requires additional resources than the allocated resources), extra VM's are placed within the cluster 34. To address one or both of these situations (healing and/or scale-out), sufficient nodes are allocated to the respective buffers.

When the new deployment threshold is reached in the cluster 34, no new VM deployments can occur into the cluster 34. When the scale out threshold is reached in the cluster 34, the existing tenants cannot grow anymore in the cluster 34. Any attempt to grow results in a scale out failure. If the healing buffer is exhausted in the cluster 34, any node/rack failures cannot be healed, and a healing failure occurs. Setting the thresholds determines the size of the buffers (e.g., too small, too large, or balanced). The thresholds can be optimized and failures can be minimized based on the predictions from the resource management system 1.

FIG. 7 shows examples of different types of VMs depending on their resource requirements. These are only examples, and additional types of VM categories are contemplated. Due to the different resource requirements, the type or category of a VM is an important consideration in the allocation decision. For example, the resource management system 1 can collect and analyze data for many types of VMs. Based on the data, the resource management system 1 can use information regarding the type of a VM that is to be deployed and predict whether the VM will be user-facing or non-user-facing, the lifetime of the VM, and so on.

Accordingly, the resource management system 1, when implemented by the cloud computing system 10, can analyze historical tenant size patterns, VM lifetime patterns, resource utilization patterns, and so on, and learn from correlations of these patterns with customer, deployment time, VM type, number of VMs, and so on. Based on the analyses and correlations, the resource management system 1 can generate the various predictions mentioned above, which can be used to improve VM allocation and resource management in the cloud computing system 10. For example, the predictions can be used to improve allocation of tenants to clusters based on the expected full size of their deployments as predicted, to allocate VMs with similar expected times (as predicted) to the same servers, to power cap non-user-facing VMs while allowing user-facing VMs to use full power by mixing the two types of VMs based on the prediction, and so on. These and other features of the resource management system 1 are explained below in detail with reference to the specific use cases mentioned above.

FIGS. 8-11 describe the methods for implementing the specific use cases. In the description of the methods below, the term control refers to one or more of the client and server applications 366 and 386 described below with reference to FIGS. 12-14, which implement all or some aspects of one or more components of the resource management system 1 and one or more methods of the use cases described below. In other words, the term control as used in the description of the methods below represents code or instructions executed by one or more components of the cloud computing system 10 shown in FIG. 3 to perform the described functionality.

Figure 8:
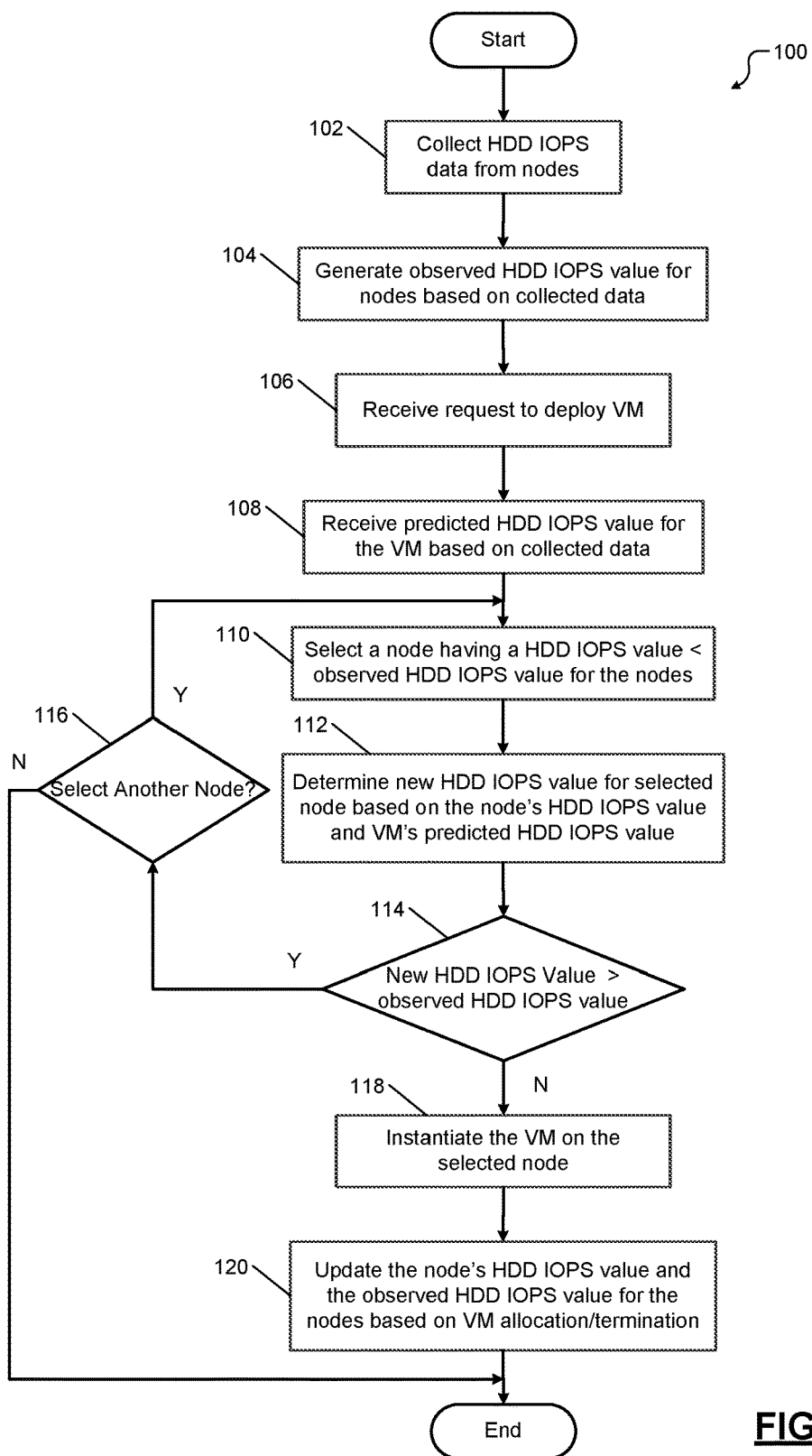
FIG. 8 is a flowchart illustrating an example of a method for using average/maximum hard disk drive (HDD) input output operations per second (IOPS) predictions to minimize the co-location of HDD-bound virtual machines.

FIG. 8 shows a method 100 for the first use case, which involves using average/maximum HDD IOPS predictions to minimize the co-location of HDD-bound VMs. Before describing the method 100, a description of the first use case follows. The first use case depends generally on the prediction of VM average and maximum resource utilizations (for all resources, not just CPU), and specifically on the prediction of the current average and maximum HDD IOPS for each host.

HDD IOPS is often a performance-critical resource on a host. Interference between VMs due to HDD IOPS can severely degrade the VMs' performance. Accordingly, the improvement provided by the method 100 seeks to maintain the combined average and/or maximum HDD IOPS of the VMs on a host around the cluster's average and/or maximum HDD IOPS. To implement the method 100, a rule is added to the VM Allocator 4 to compare the predicted average and/or maximum HDD IOPS of each server to the respective cluster-wide average values (average of the server averages and/or average of the server maximums). A host with too high a predicted average and/or maximum HDD IOPS is skipped (i.e., not considered as a possible candidate for deploying a VM). The per-host and cluster-wide average and/or maximum HDD IOPS are updated each time a VM is allocated to or terminates at a host. Effectively, the method 100 can spread out HDD-bound VMs, thus balancing the HDD IOPS and reducing the chance of interference between VMs.

An example of a pseudocode to implement the above rule follows. The following code assumes that both average and maximum HDD IOPS are tracked.

```
for (each host still being considered) {
    new_host_iops_avg = all_vms_iops_avg + new_vm_pred_iops_avg;
    new_host_iops_max = all_vms_iops_max +
    new_vm_pred_iops_max;
    if (new_host_iops_avg <= cluster_iops_avg &&
    new_host_iops_max <= cluster_iops_max)
        mark_host_eligible( );
}
if (!is_any_host_marked_eligible( ))
    mark_all_hosts_eligible( );
```

The following operations are performed upon VM allocation.

```
update_host_iops_avg( );    // This adds the predicted average to the recently observed average for the host
update_host_iops_max( );    // This adds the predicted maximum to the recently observed maximum for the host
update_cluster_iops_avg( ); // This updates the cluster-wide average of the server averages accordingly
update_cluster_iops_max( ); // This updates the cluster-wide average of the server maximums accordingly
```

The following operations are performed when the VM terminates.

```
update_host_iops_avg( );    // This subtracts the predicted avg for the VM from the recently observed avg
update_host_iops_max( );    // This subtracts the predicted max for the VM from the recently observed max
update_cluster_iops_avg( ); // This updates the cluster-wide average of the server averages accordingly
update_cluster_iops_max( ); // This updates the cluster-wide average of the server maximums accordingly
```

An alternative approach would be to mark as eligible N hosts with (1) the lowest current average and/or maximum HDD IOPS and (2) enough available resources for the new VM. This approach would not require the predictions. However, this approach would require the current per-host average and/or maximum HDD IOPS to be repeatedly sorted.

Note that the above rule-based approach does not require keeping track of each VM's actual average and/or maximum HDD IOPS. The predicted average and/or maximum HDD IOPS values for each VM can be obtained from the prediction engine 2. The approach dynamically tracks average and/or maximum HDD IOPS per host, which is available from other services running on the CCS 10. Any errors in the predictions get at least partially corrected by this tracking, as predictions are continuously replaced by actual observations. In case the prediction engine 2 has low confidence in its prediction, the rule can be skipped altogether, and all hosts that are still being considered can be marked as eligible for the next rule (e.g., of another use case). In this low-confidence case, the operations associated with VM allocation and termination mentioned above are not performed.

FIG. 8 showing the method 100 is now described in detail. At 102, control collects data regarding HDD IOPS from the nodes running VM's. At 104, control generates an observed HDD IOPS value for the nodes based on the collected data. The observed HDD IOPS value may be an average or maximum HDD IOPS value or both. At 106, control receives a request to deploy a VM on one of the nodes. At 108, control receives a predicted HDD IOPS value for the VM. The predicted HDD IOPS value is generated based on the collected data. The predicted HDD IOPS value may be an average or maximum HDD IOPS value or both.

At 110, control selects a node having a HDD IOPS value that is less than the observed HDD IOPS value for the nodes as a target node for deploying the VM. At 112, control determines a new HDD IOPS value for the selected node based on the selected node's HDD IOPS value and the VM's predicted HDD IOPS value. At 114, control determines whether the new HDD IOPS value for the selected node is greater than the observed HDD IOPS value for the nodes. At 116, if the new HDD IOPS value for the selected node is greater than the observed HDD IOPS value for the nodes, control determines whether to select another node as a target node for deploying the VM. Control returns to 110 if another node is selected as a target node for deploying the VM. Control ends if another node is not selected as a target node for deploying the VM.

At 118, if the new HDD IOPS value for the selected node is not greater than the observed HDD IOPS value for the nodes at 114, control instantiates or deploys the VM on the selected node. At 120, control updates the selected node's HDD IOPS value and the observed HDD IOPS value for the nodes based on the VM's allocation/termination.

Figure 9:
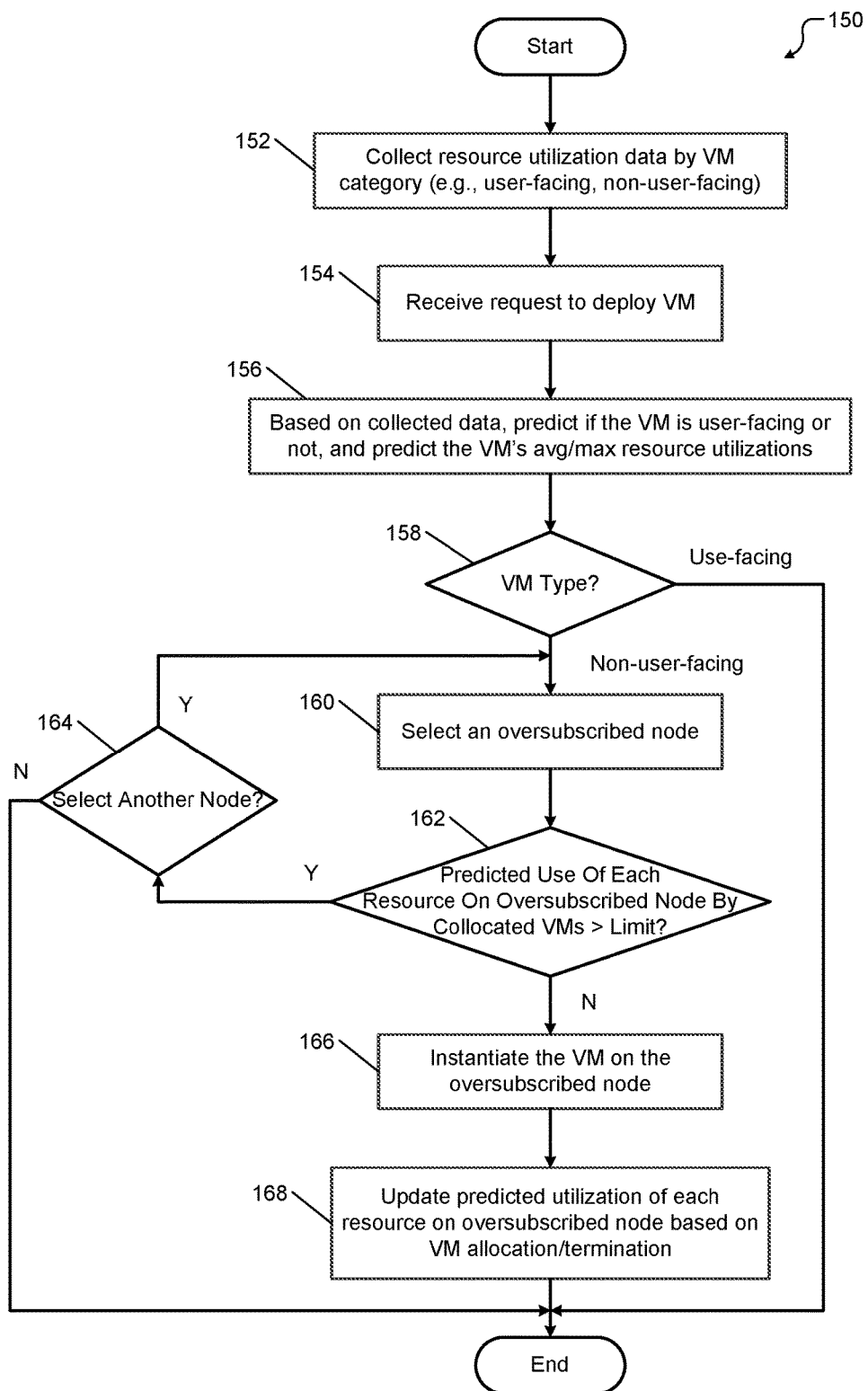
FIG. 9 is a flowchart illustrating an example of a method for using virtual machine category and average/maximum resource utilization predictions to implement oversubscription.

FIG. 9 shows a method 150 for the second use case, which involves using VM category and average/maximum resource utilization predictions to implement oversubscription. Before describing the method 150, a description of the second use case follows. The second use case depends on the prediction of VM average and maximum resource utilizations (for all resources, not just CPU) and on the prediction of the VM category.

In oversubscription, VMs from non-production subscriptions are typically allocated to the same host up to a maximum level of oversubscription of the physical CPU cores. Oversubscription management can be improved by (1) using a finer grained categorization of VMs than production and non-production at the subscription level, and (2) accounting for the expected resource utilization of the VMs while making allocation decisions. The method 150 for improving the oversubscription management uses per-role VM categories (potentially user-facing/interactive vs. non-user-facing/background/batch) predicted by the prediction engine 2 using the past history of CPU utilizations of the corresponding VM roles (where a VM role includes its subscription and deployment IDs). The method 150 for improving the oversubscription management leverages the average and/or maximum resource utilization predictions for important resources (not just CPU cores, but also other parameters like HDD IOPS), and ensures that VM allocations are unlikely to exhaust the physical resources of oversubscribed hosts.

An example of a pseudocode to implement the method 150 follows. The following code assumes that the intent is to limit the predicted combined maximum utilization of the resources (i.e., to limit the sum of the maximum predicted utilizations).

```
// MAX_CPU_OVERSUBSCRIPTION: maximum allowable CPU oversubscription ratio of an oversubscribable host
// MAX_ACCEPTABLE_UTILIZATION[i]: maximum allowable resource i utilization of an oversubscribable host
if (new_vm_pred_user_facing)
    mark all non-oversubscribable hosts still being considered that have room for the VM as eligible;
else {
    for (each oversubscribable host still being considered) {
        host_CPU_oversubscription_ratio = (host_CPU_allocation + new_vm_CPU_allocation) / SKU_CPUs;
        if (host_CPU_oversubscription_ratio <= MAX_CPU_OVERSUBSCRIPTION) {
            for (each resource i we track) {
                new_host_max_util[i] = host_pred_max_util[i] + new_vm_pred_max_util[i];
                if (new_host_max_util[i] > MAX_ACCEPTABLE_UTILIZATION[i])
                    break;
            }
            if (i == number of resources we track)
                mark_host_eligible( );
        }
    }
    if (!is_any_host_marked_eligible( )) {
        for (each oversubscribable host still being considered) {
            host_CPU_oversubscription_ratio = (host_CPU_allocation + new_vm_CPU_allocation) / SKU_CPUs;
            if (host_CPU_oversubscription_ratio <= MAX_CPU_OVERSUBSCRIPTION)
                mark_host_eligible( );
        }
    }
}
```

The following operations are performed upon VM allocation.

```
if (!new_vm_pred_user_facing) {
    update_host_CPU_allocation( ); // Add the CPU allocation of the new VM to host_CPU_allocation
    update_host_pred_max_util( ); // Add the predicted max utilization for all resources we track
}
```

The following operations are performed when the VM terminates.

```
if (!vm_pred_user_facing) {
    update_host_CPU_allocation( ); // Subtract the CPU allocation of the VM from host_CPU_allocation
    update_host_pred_max_util( ); // Subtract the predicted max utilization for all resources we track
}
```

This approach does not require the allocator to track each VM's (or even each host's) actual average and/or maximum resource utilizations. The predicted average and/or maximum values for each VM and its categorization can be obtained from the prediction engine 2. A prediction error in VM category by the prediction engine 2 could cause a user-facing VM to be allocated to an oversubscribed host. However, VM role categories are generally consistent over time. Therefore, the likelihood of a mis-prediction is very small. Nevertheless, relatively low maximum utilization limits can be used to prevent poor behavior even in rare category mis-prediction cases. A prediction error in maximum utilization for a VM is unlikely to cause problems, unless the prediction engine 2 under-predicts these values for many co-located VMs (the maximum utilizations of the co-located VMs may not occur at the same time). Utilization mis-predictions would be more prone to problems if the intent is to limit the combined predicted average utilizations, instead of limiting the combined predicted maximum utilizations. In case the prediction engine 2 has low confidence in its predictions for this VM, it can be safely assumed that this VM will be user-facing and will exhibit high utilizations.

FIG. 9 showing the method 150 is now described in detail. At 152, control collects data from multiple nodes running virtual machines regarding utilization of resources for the nodes by VM category (e.g., user-facing, non-user-facing). At 154, control receives a request to deploy the VM on one of the nodes. At 156, based on the collected data, control predicts if the VM is user-facing or non-user-facing, and predicts the VM's average/maximum resource utilizations. At 158, based on the prediction, control ends if the VM is user facing. At 160, based on the prediction, if the VM is non-user-facing, control selects an oversubscribed node as a target for deploying the VM.

At 162, control determines whether the predicted use of each resource on the selected oversubscribed node by co-located VM's is greater than a predetermined limit. At 164, if the predicted use of each resource on the selected oversubscribed node by co-located VM's is greater than a predetermined limit at 162, control determines whether to select another oversubscribed node as a target node for deploying the VM. Control returns to 160 if another oversubscribed node is selected as a target node for deploying the VM. Control ends if another oversubscribed node is not selected as a target node for deploying the VM.

At 166, if the predicted use of each resource on the selected oversubscribed node by co-located VM's is not greater than a predetermined limit at 162, control instantiates or deploys the VM on the selected oversubscribed node. At 168, control updates the predicted utilization of each resource on the oversubscribed node based on the VM's allocation/termination.

Figure 10:
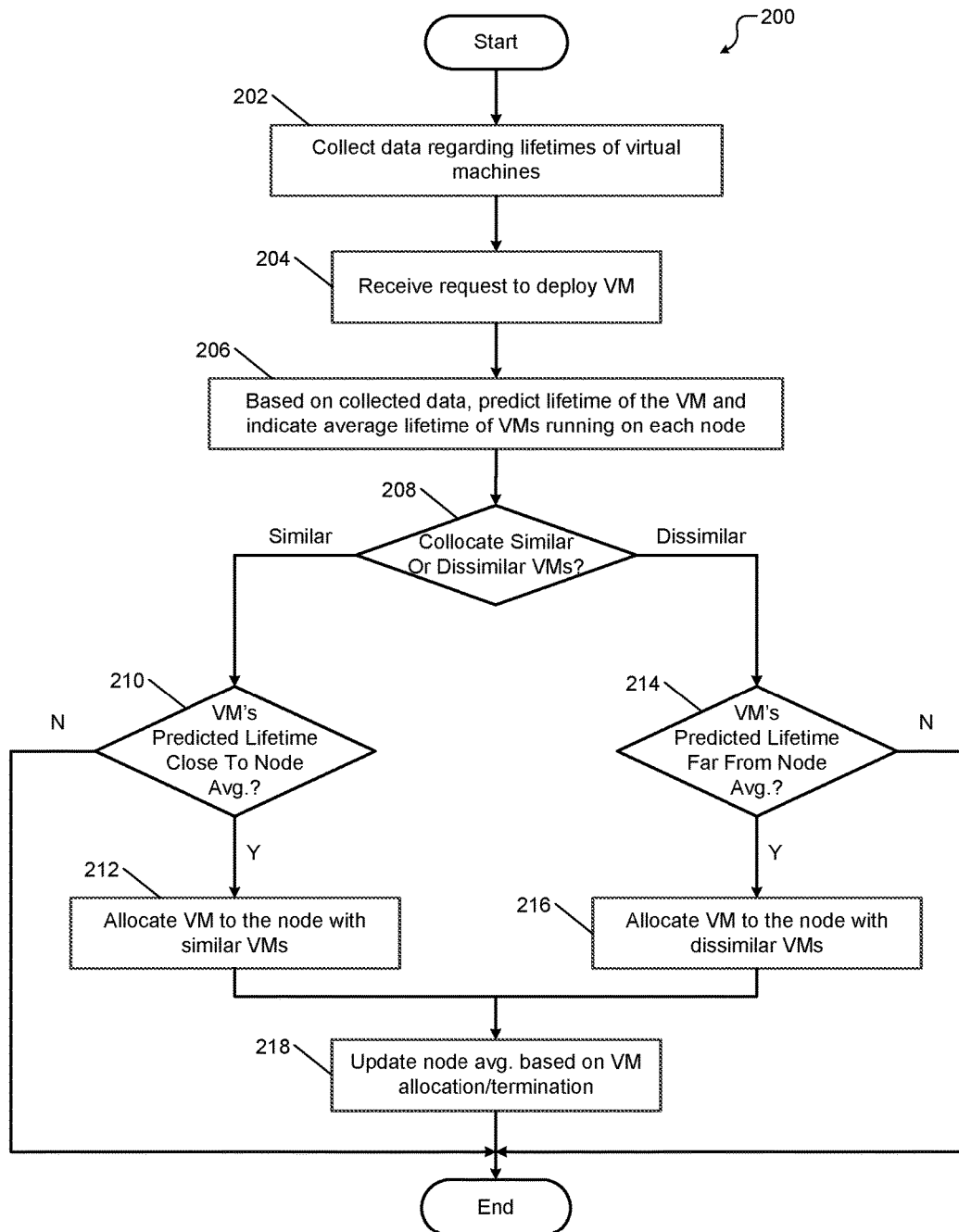
FIG. 10 is a flowchart illustrating an example of a method for allocating virtual machines with similar/dissimilar lifetimes on the same servers.

FIG. 10 shows a method 200 for the third use case, which involves allocating VMs with similar/dissimilar lifetimes on the same servers. Before describing the method 200, a description of the third use case follows. The third use case depends on the prediction of VM lifetime.

Most VMs live for relatively short times (e.g., less than 1 hour). Given this observation, the VM allocator 4 may implement a first policy to co-locate short-lived VMs (while segregating them from long-lived VMs), so that most hosts can be freed up for maintenance (e.g., software updates) quickly without the need for VM migration. Alternatively, the VM allocator 4 may implement a second policy to co-locate VMs with dissimilar lifetimes, so that each host would have only a few VMs (the long-lived VMs) that would need to be migrated when maintenance is required.

An example of a pseudocode to implement the method 200 follows. The following code adapts to either co-location policy described above. In the following code, close means different by less than a predetermined number of standard deviations (e.g., two standard deviations).

```
for (each host still being considered) {
    two_std_dev_avg = get_two_stddev_avg(host);
    diff_with_two_std_dev_avg = abs(vm_predicted_lifetime -
        host_all_vms_lifetime_avg);
    should_mark_host_eligible = tune_for_similarity
        : diff_with_two_std_dev_avg <= two_std_dev_of_avg
        : diff_with_two_std_dev_avg > two_std_dev_of_avg;
    if (should_mark_host_eligible)
        mark_host_eligible( );
}
if (!is_any_host_marked_eligible( ))
    mark_all_hosts_eligible( );
```

The following operations are performed upon VM allocation.
compute_host_avg_and_two_std_dev( ); //Update host stats based on predicted lifetime of the new VM The following operations are performed when the VM terminates.
compute_host_avg_and_two_std_dev( ); //Update host stats based on predicted lifetime of the finished VM The above approach incrementally tracks the average lifetime of VMs and the corresponding standard deviation on each host. When considering allocating a VM to a host, the predicted lifetime for the VM is compared with the predicted average VM lifetime at the host. If the policy is to segregate short- and long-lived VMs, the VM is allocated to the host if the VM's predicted lifetime is close (e.g., within one or two standard deviations) to the current VM lifetime at the host. If the policy to mix short- and long-lived VMs on each host, the VM is allocated to the host if the VM's predicted lifetime is far from the current VM lifetime at the host (i.e., different by more than a predetermined number of standard deviations (e.g., two standard deviations)).

Note that this approach does not require the allocator to track the predicted (or actual) lifetimes of all VMs at each host. The standard deviation can be incrementally computed simply using the current predicted average lifetime and the running sum of the squared differences between predicted lifetimes and the predicted average at each point in time. Lifetime predictions can be obtained from the prediction engine 2. Lifetime mis-predictions can cause deviations from the desired co-location property. However, these effects are only likely to be significant if the prediction engine 2 consistently mis-predicts lifetimes, which is unlikely. In case of a low-confidence prediction, the rule and the updates at allocation and termination time mentioned above may be skipped (i.e., the VM to be allocated is not counted towards its host's average and standard deviation).

FIG. 10 showing the method 200 is now described in detail. At 202, control collects data regarding lifetimes of virtual machines running on multiple nodes. At 204, control receives a request to deploy a VM on one of the nodes. At 206, based on the collected data, control predicts the lifetime of the VM to be deployed and indicates an average lifetime of VM's running on each node. At 208, control determines if the policy is to co-locate similar or dissimilar virtual machines (i.e., VMs with similar or dissimilar lifetimes).

At 210, if the policy is to co-locate VM's with similar lifetimes, control determines whether the predicted lifetime of the virtual machine to be deployed is close to (e.g., within two standard deviations of) the average lifetime of the selected node. Control ends if the predicted lifetime of the virtual machine to be deployed is not close to the average lifetime of the selected node. At 212, if the predicted lifetime of the virtual machine to be deployed is close to the average lifetime of the selected node, control allocates or deploys the VM on the selected node with similar VM's (i.e., with VM's having similar lifetimes as the predicted lifetime of the VM to be deployed).

At 214, if the policy is to co-locate VM's with dissimilar lifetimes, control determines whether the predicted lifetime of the virtual machine to be deployed is far from (i.e., not within or different by more than a predetermined number of standard deviations (e.g., two standard deviations of) the average lifetime of the selected node. Control ends if the predicted lifetime of the virtual machine to be deployed is not far from the average lifetime of the selected node. At 216, if the predicted lifetime of the virtual machine to be deployed is far from the average lifetime of the selected node, control allocates or deploys the VM on the selected node with dissimilar VM's (i.e., with VM's having dissimilar lifetimes than the predicted lifetime of the VM to be deployed).

Figure 11:
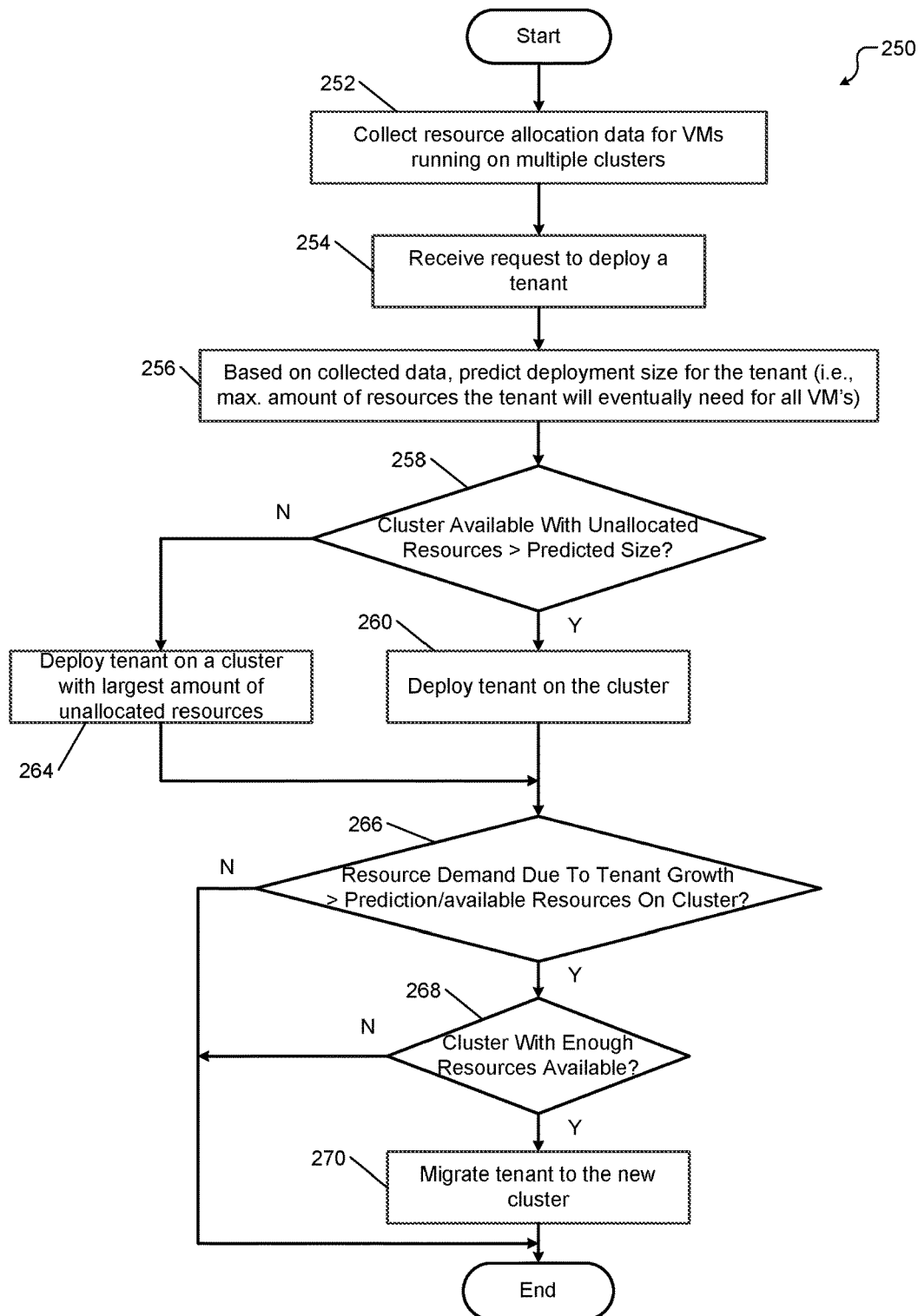
FIG. 11 is a flowchart illustrating an example of a method for using deployment size predictions to select appropriate cluster for deploying a virtual machine and allowing tenant growth.

FIG. 11 shows a method 250 for the fourth use case, which involves using deployment size predictions to select appropriate cluster and allow tenant growth. Before describing the method 250, a description of the fourth use case follows. The fourth use case depends on the prediction of the deployment size.

A tenant typically cannot grow beyond the capacity of the cluster to which it is first assigned. The method 250 minimizes deployment failures resulting from tenant growth, while allowing the size of per-cluster growth buffers to be reduced. The method 250 selects the appropriate cluster(s) for deployment. The method 250 leverages the deployment size predictions from the prediction engine 2 to mark clusters that have enough available resources as eligible targets for each new deployment. If no cluster has enough resources, the method 250 selects the cluster with the largest amount of available resources.

An example of a pseudocode to implement the method 250 follows.

```
for (each cluster still being considered)
        if (cluster_free_resources >=
        predicted_vm_deployment_size)
                mark_cluster_eligible( );
    else
        if (cluster_free_resources > max_free) {
            max_free = cluster_free_resources;
            cluster_with_largest_free_space = this_cluster;
        }
if (!is_any_cluster_marked_eligible( ))
        mark_clusters_eligible(cluster_with_largest_free_space);
```

The following operations are performed upon VM allocation.
update_cluster_free_resources( ); //Subtract the size of the VM from the free resources of the cluster The following operations are performed when the VM terminates.
update_cluster_free_resources( ); //Add the size of the VM to the free resources of the cluster The cluster selection infrastructure typically maintains information about the available resources in each cluster. The predicted size for a deployment can be obtained from the prediction engine 2. A prediction error in deployment size could cause a cluster with insufficient resources to be selected. This situation can be traded off against the ability to reduce the size of growth buffers. Depending on the mis-prediction rate, the size of the growth buffers can be reduced without a meaningful increase in deployment failures.

FIG. 11 showing the method 250 is now described in detail. At 252, control collects resource allocation data for VM's running on multiple clusters. At 254, control receives a request to deploy a tenant on one of the clusters. At 256, based on the collected data, control predicts a deployment size for the tenant (i.e., the maximum amount of resources the tenant will need for all of its VMs). In other words, the prediction will indicate the maximum amount of resources that the full deployment of the tenant's VMs will eventually require. Accordingly, the deployment size is the maximum amount of resources that will eventually need to be allocated for a full set of VMs in the same tenant deployment. Further, the prediction is relevant when a first VM of the tenant deployment is about to be created/placed/assigned in a cluster. Thereafter, all the subsequent VMs of the same tenant deployment will be created/placed/assigned in the same cluster that is selected for the first VM of the tenant deployment.

At 258, control determines if a cluster is available with an amount of unallocated resources greater than the predicted deployment size for the tenant. At 260, if a cluster is available with an amount of unallocated resources greater than the predicted deployment size for the tenant, control deploys the tenant (or more specifically, a first VM of the tenant) on that cluster.

At 264, if a cluster is not available with an amount of unallocated resources greater than the predicted deployment size for the tenant, control selects a cluster with the largest amount of unallocated resources, and deploys the tenant (or more specifically, a first VM of the tenant) on that cluster.

At 266, after the tenant is deployed at 258 or 264, control determines whether the resource demand due to tenant growth is greater than the predicted deployment size or the available resources on the cluster, whichever is less. At 268, if the resource demand due to tenant growth is greater than the predicted deployment size or the available resources on the cluster, control determines if another cluster is available with enough resources to support the increased demand due to tenant growth. At 270, if another cluster is available with enough resources to support the increased demand due to tenant growth, control migrates the tenant to the new cluster. Since tenant deployments can be smartly placed across the clusters based on the deployment size predictions, system designers can better allocate or adjust (e.g., reduce) the amount of resources reserved for tenant growth (i.e., the size of the growth buffers).

Additionally, a fifth use case involves mixing VM categories on the same aggregations (e.g., chassis) to help power capping. This use case depends on VM category prediction (i.e., whether the VM is user-facing or non-user-facing).

Power-capping user-facing VMs can degrade their performance and is therefore undesirable. Instead, if necessary, non-user-facing VMs may be power-capped to whatever extent needed to meet power budgets. Mixing VM categories on the same aggregation ensures that any aggregation at which power capping may be necessary, enough non-user-facing VMs are available to minimize the need to power-cap user-facing VMs. In addition, since power capping can be typically only applied at the granularity of a full host, user-facing and non-user-facing VMs can be segregated on different hosts within the aggregation.

This improvement applies to any aggregation, e.g., any chassis, any rack, any row. However, the following discussion concerns its application at the chassis level, since this is the only level at which power can be currently capped (by capping host power). In this scenario, the allocator may spread the non-user-facing VMs across different chassis, while concentrating them on a subset of hosts that is not shared with user-facing VMs within each chassis. Accordingly, each chassis controller will have some power slack it can exploit as the need to power-cap its chassis arises.

An example of a pseudocode to implement the above approach follows.

```
for (each host still being considered) {
    if (is_vm_pred_user_facing( )) {
        if (host.chassis.UF_vcores <= chassis.avg_UF_vcores) {
            host.chassis.can_receive_vm = TRUE;
            if (is_host_running_any_user_facing_vms( )) {
                mark_host_eligible( );
                host.chassis.has_at_least_one_selected_host = TRUE;
            }
        }
    } else {
        if (host.chassis.NUF_vcores <= chassis.avg_NUF_vcores) {
            host.chassis.can_receive_vm = TRUE;
            if (is_host_running_non_user_facing_vms_only( )) {
                mark_host_eligible( );
                host.chassis.has_at_least_one_selected_host = TRUE;
            }
        }
    }
}
for (each host still being considered) {
    if (host.chassis.can_receive_vm == TRUE &&
        host.chassis.has_at_least_one_selected_host == FALSE) {
        mark_host_eligible( );
    }
}
if (!is_any_host_marked_eligible( ))
    mark_all_hosts_eligible( );
```

The following operations are performed upon VM allocation.

```
if (is_vm_pred_user_facing( )) {
    mark_host_running_any_user_facing_vms( );  // This states that at least one UF VM is running on host
    update_host_UF_vcores_count( );             // This updates the number of UF vcores on the host
    update_host_chassis_UF_vcores( );           // This updates the number of UF vcores in the chassis
```

```
    update_chassis_avg_UF_vcores( );        // This updates the avg number of UF vcores per chassis
} else {
    update_host_NUF_vcores_count( );        // This updates the number of NUF vcores on the host
    update_host_chassis_NUF_vcores( );      // This updates the number of NUF vcores in the chassis
    update_chassis_avg_NUF_vcores( );       // This updates the avg number of NUF vcores per chassis
}
```

The following operations are performed when the VM terminates.

```
if (is_vm_pred_user_facing( )) {
    update_host_UF_vcores_count( );
    update_host_chassis_UF_vcores( );
    update_chassis_avg_UF_vcores( );
    if (host_UF_vcores_count == 0)
        mark_host_running_non_user_facing_vms_only( );
} else {
    update_host_NUF_vocres_count( );
    update_host_chassis_NUF_vcores( );
    update_chassis_avg_NUF_vcores( );
}
```

The predicted category for any VM can be obtained from the prediction engine 2. A prediction error in VM category could cause a user-facing (non-user-facing) VM to be allocated in a less-than-ideal chassis or with a non-user-facing (user-facing) VM on the same node. Neither of these scenarios will be a significant problem, unless the prediction engine 2 consistently mis-predicts categories. However, VM role categories are generally consistent over time, and therefore the likelihood of a mis-prediction is very small. To be conservative, a low-confidence prediction can be handled as if the VM will be user-facing.

The above improvement can be generally described as follows. The allocator may receive a request to deploy a virtual machine on one of a plurality of nodes running a plurality of virtual machines in a cloud computing system, where a total amount of power supplied to the plurality of nodes is limited to less than or equal to a predetermined value. The allocator may receive a prediction indicating that the virtual machine is of a first type that is amenable to a limited amount of performance degradation (e.g., non-user-facing VM) or a second type that is not amenable to performance degradation (e.g., user-facing VM). The allocator may allocate the virtual machine to one of the plurality of nodes when the virtual machine is of the second type and at least one of the plurality of virtual machines is of the first type. Accordingly, the power controller can reduce an amount of power available to one or more of the plurality of virtual machines of the first type when a total power requirement of the plurality of nodes exceeds the predetermined value.

Below are simplistic examples of a distributed computing environment in which the systems and methods of the present disclosure can be implemented. Throughout the present disclosure, references to terms such as servers, client devices, applications, and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 12:
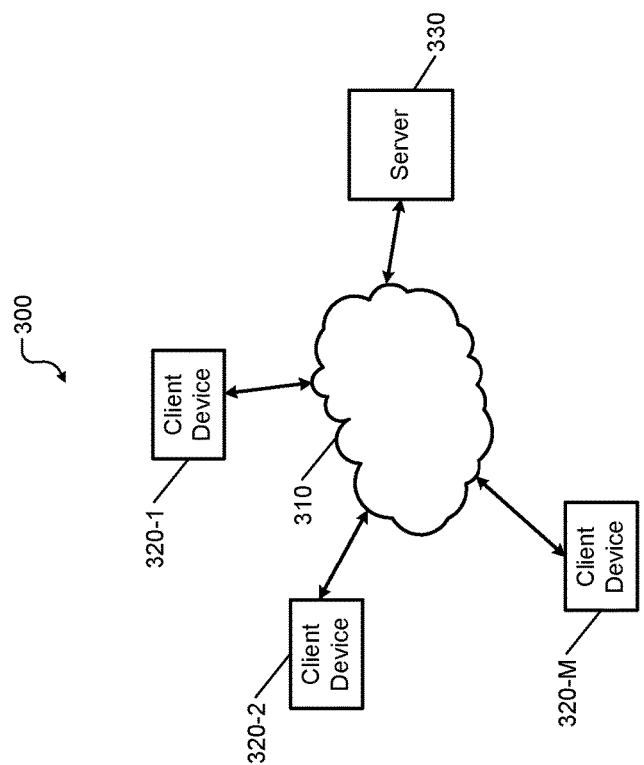
FIG. 12 is a functional block diagram of a simplified example of a distributed network system.

FIG. 12 shows a simplified example of a distributed network system 300. The distributed network system 300 includes a network 310, one or more client devices 320-1, 320-2, . . . , and 320-N (collectively client devices 320) (where N is an integer greater than or equal to one), and a server 330. The network 310 may include a local area network (LAN), a wide area network (WAN) such as the Internet, or other type of network (collectively shown as the network 310). While only one server is shown, the distributed network system 300 may include multiple servers. The client devices 320 communicate with the server 330 via the network 310. The client devices 320 and the server 330 may connect to the network 310 using wireless and/or wired connections to the network 310.

One or more servers 330 and the client devices 320 may implement one or more components of the cloud computing system 10 shown in FIG. 3. For example, one server 330 may implement the cloud controller 12 or the compute resource provider 26 of the cloud controller 12 while one or more client devices 320 may implement the fabric controllers 32. Alternatively, one or more servers 330 may implement one or more components of the cloud controller 12. Many different configurations of implementations are contemplated.

The server 330 may provide multiple services to the client devices 320. For example, the server 330 may execute a plurality of software applications. The server 330 may host multiple databases that are utilized by the plurality of software applications and that are used by the client devices 320. In addition, the server 330 and the client devices 320 may execute applications that implement one or more components of the resource management system 1 and one or more methods for the use cases described above.

Figure 13:
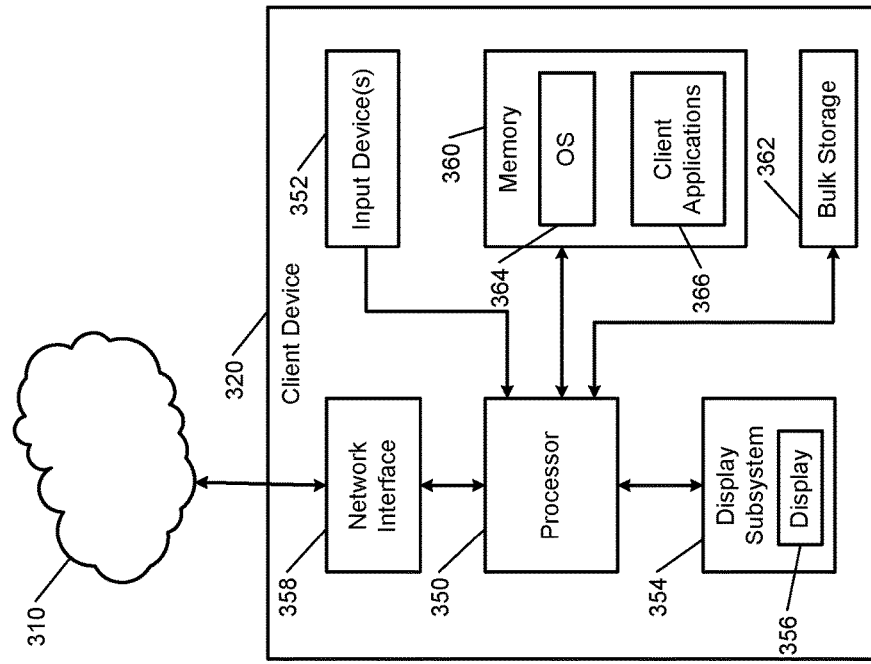
FIG. 13 is a functional block diagram of a simplified example of a client device used in the distributed network system of FIG. 12.

FIG. 13 shows a simplified example of the client device 320. The client device 320 may typically include a central processing unit (CPU) or processor 350, one or more input devices 352 (e.g., a keypad, touchpad, mouse, and so on), a display subsystem 354 including a display 356, a network interface 358, a memory 360, and a bulk storage 362.

The network interface 358 connects the client device 320 to the distributed network system 300 via the network 310. For example, the network interface 358 may include a wired interface (e.g., an Ethernet interface) and/or a wireless interface (e.g., a Wi-Fi, Bluetooth, near field communication (NFC), or other wireless interface). The memory 360 may include volatile or nonvolatile memory, cache, or other type of memory. The bulk storage 362 may include flash memory, a hard disk drive (HDD), or other bulk storage device.

The processor 350 of the client device 320 executes an operating system (OS) 364 and one or more client applications 366. The client applications 366 include an application to connect the client device 320 to the server 330 via the network 310. The client device 320 accesses one or more applications executed by the server 330 via the network 310. The client applications 366 may also include an application that implements all or some aspects of one or more components of the resource management system 1 and one or more methods for the use cases described above.

Figure 14:
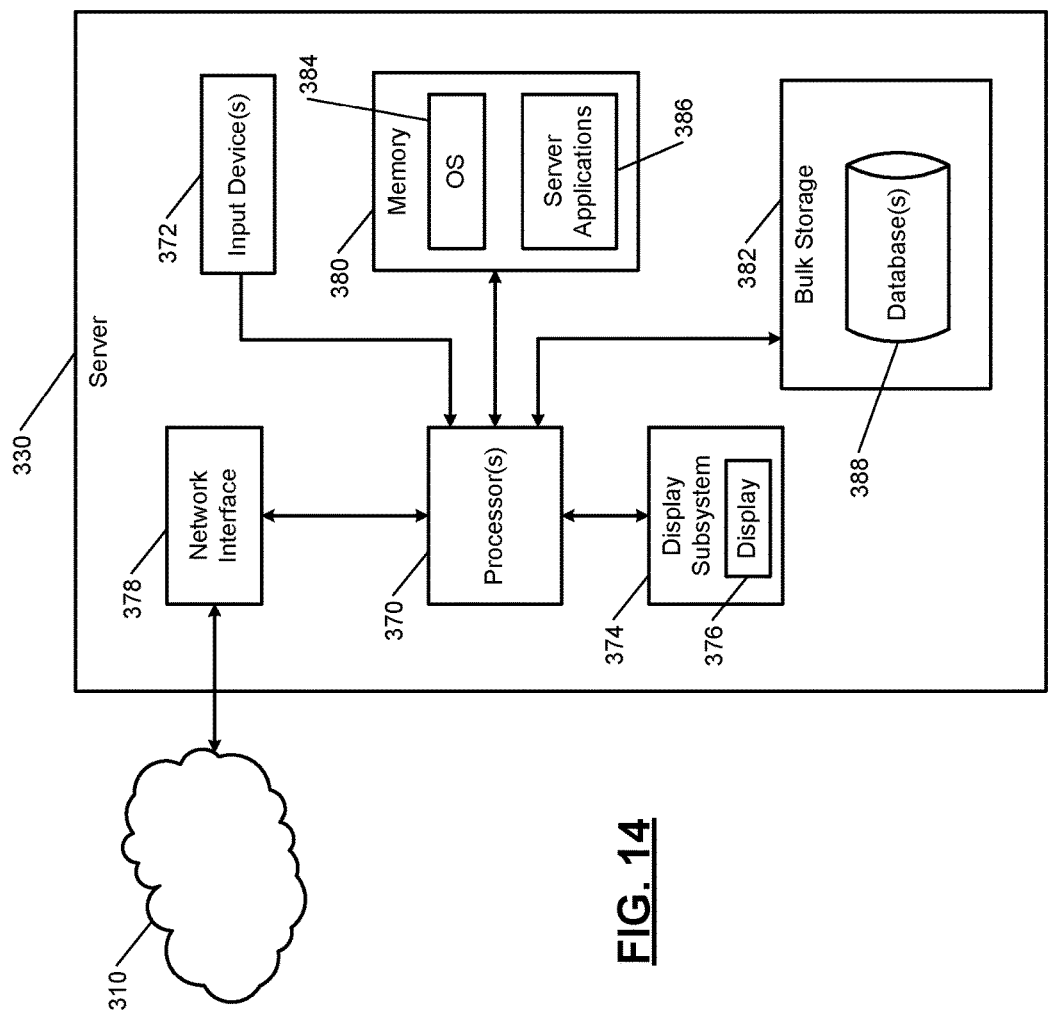
FIG. 14 is a functional block diagram of a simplified example of a server used in the distributed network system of FIG. 12.

FIG. 14 shows a simplified example of the server 330. The server 330 typically includes one or more CPUs or processors 370, one or more input devices 372 (e.g., a keypad, touchpad, mouse, and so on), a display subsystem 374 including a display 376, a network interface 378, a memory 380, and a bulk storage 382.

The network interface 378 connects the server 330 to the distributed network system 300 via the network 310. For example, the network interface 378 may include a wired interface (e.g., an Ethernet interface) and/or a wireless interface (e.g., a Wi-Fi, Bluetooth, near field communication (NFC), or other wireless interface). The memory 380 may include volatile or nonvolatile memory, cache, or other type of memory. The bulk storage 382 may include flash memory, one or more hard disk drives (HDDs), or other bulk storage device.

The processor 370 of the server 330 executes an operating system (OS) 384 and one or more server applications 386. The server applications 386 may include an application that implements all or some aspects of one or more components of the resource management system 1 and one or more methods for the use cases described above. The bulk storage 382 may store one or more databases 388 that store data structures used by the server applications 386 to perform respective functions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium or machine-readable medium. The term computer-readable medium or machine-readable medium, as used herein, does not encompass transitory electrical or electromagnetic signals propagating through a medium (such as on a carrier wave); the term computer-readable medium or machine-readable medium may therefore be considered tangible and non-transitory. Non-limiting examples of a non-transitory, tangible computer-readable medium or machine-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a processor and memory; and
machine readable instructions stored in the memory, when executed by the processor, configure the processor to:
receive a request to deploy a virtual machine on a node from a plurality of nodes running a plurality of virtual machines in a cloud computing system;
select one of the plurality of nodes having a hard disk drive (HDD) input output operations per second (IOPS) value less than an observed HDD IOPS value for the plurality of nodes running the plurality of virtual machines, the observed HDD IOPS value including a maximum HDD IOPS value for the plurality of nodes;
receive a predicted HDD IOPS value for the virtual machine;
determine a new HDD IOPS value for the selected node based on the HDD IOPS value for the selected node and the predicted HDD IOPS value for the virtual machine, the predicted HDD IOPS value including a maximum predicted HDD IOPS value for the virtual machine; and
instantiate the virtual machine on the selected node when the new HDD IOPS value for the selected node is less than or equal to the observed HDD IOPS value for the plurality of nodes.

2. The system of claim 1 wherein the machine readable instructions further configure the processor to:
collect data regarding HDD IOPS performed by the plurality of nodes when running the plurality of virtual machines; and
generate the observed HDD IOPS value for the plurality of nodes based on the collected data.

3. The system of claim 1 wherein the machine readable instructions further configure the processor to:
collect data regarding HDD IOPS performed by the plurality of nodes when running the plurality of virtual machines; and
generate the predicted HDD IOPS value for the virtual machine based on the collected data.

4. The system of claim 1 wherein:
the observed HDD IOPS value for the plurality of nodes includes an average HDD IOPS value for the plurality of nodes; and
the predicted HDD lops value for the virtual machine includes an average predicted HDD IOPS value for the virtual machine.

5. The system of claim 1 wherein the machine readable instructions further configure the processor to update the HDD IOPS value for the selected node and the observed HDD IOPS value for the plurality of nodes when the virtual machine is instantiated on the selected node.

6. The system of claim 1 wherein the machine readable instructions further configure the processor to update the HDD IOPS value for the selected node and the observed HDD IOPS value for the plurality of nodes when the virtual machine terminates on the selected node.

7. The system of claim 1 wherein the machine readable instructions further configure the processor to update the observed HDD IOPS value for the plurality of nodes when one of the plurality of virtual machines terminates on the plurality of nodes.

8. The system of claim 1 wherein the machine readable instructions further configure the processor to dynamically track average or maximum HDD IOPS value for each of the plurality of nodes.

9. The system of claim 1 wherein the machine readable instructions further configure the processor to not track average or maximum HDD IOPS value for each of the plurality of virtual machines.

10. A method comprising:
receiving a request to deploy a virtual machine on a node from a plurality of nodes running a plurality of virtual machines in a cloud computing system;
collecting data regarding hard disk drive (HDD) input output operations per second (IOPS) performed by the plurality of nodes when running the plurality of virtual machines;
selecting one of the plurality of nodes having a hard disk drive (HDD) input output operations per second (IOPS) value less than an observed HDD lops value for the plurality of nodes running the plurality of virtual machines, the observed HDD IOPS value being generated based on the collected data, and the observed HDD IOPS value including a maximum HDD IOPS value for the plurality of nodes;
receiving a predicted HDD IOPS value for the virtual machine, the predicted HDD IOPS value being generated based on the collected data, and the predicted HDD IOPS value including a maximum predicted HDD IOPS value for the virtual machine;
determining a new HDD IOPS value for the selected node based on the HDD lops value for the selected node and the predicted HDD IOPS value for the virtual machine; and
instantiating the virtual machine on the selected node when the new HDD IOPS value for the selected node is less than or equal to the observed HDD IOPS value for the plurality of nodes.

11. The method of claim 10 wherein:
the observed HDD IOPS value for the plurality of nodes includes an average HDD IOPS value for the plurality of nodes; and
the predicted HDD IOPS value for the virtual machine includes an average predicted HDD IOPS value for the virtual machine.

12. The method of claim 10 further comprising updating the HDD IOPS value for the selected node and the observed HDD IOPS value for the plurality of nodes when the virtual machine is instantiated on the selected node.

13. The method of claim 10 further comprising updating the HDD IOPS value for the selected node and the observed HDD IOPS value for the plurality of nodes when the virtual machine terminates on the selected node.

14. The method of claim 10 further comprising updating the observed HDD IOPS value for the plurality of nodes when one of the plurality of virtual machines terminates on the plurality of nodes.

15. The method of claim 10 further comprising dynamically tracking average or maximum HDD IOPS value for each of the plurality of nodes.

16. The method of claim 10 further comprising not tracking average or maximum HDD IOPS value for each of the plurality of virtual machines.

* * * * *